(12) United States Patent
Clark

(10) Patent No.: US 6,505,945 B1
(45) Date of Patent: Jan. 14, 2003

(54) SALON MIRROR WITH SUPPORT AND NON-SLIP HANDLES

(76) Inventor: Wayne Clark, 16 Collodem Park Rd., San Rafael, CA (US) 94901

( * ) Notice: Subject to any disclaimer, the term of this patent is extended or adjusted under 35 U.S.C. 154(b) by 0 days.

(21) Appl. No.: 10/010,444

(22) Filed: Nov. 7, 2001

(51) Int. Cl.[7] ............................................. G02B 7/182
(52) U.S. Cl. ...................... 359/882; 359/883; 359/871; 359/840
(58) Field of Search ................................ 359/882, 883, 359/871, 840, 838, 875; 248/549, 476, 478, 477; D28/64.1

(56) References Cited

U.S. PATENT DOCUMENTS

| | | | | |
|---|---|---|---|---|
| 4,900,253 A | * | 2/1990 | Landis | 250/504 H |
| D333,533 S | * | 2/1993 | Lee | D28/64.1 |
| 5,926,328 A | * | 7/1999 | Fabian | 359/840 |
| 6,292,681 B1 | * | 9/2001 | Moore | 600/407 |

* cited by examiner

Primary Examiner—Mohammad Sikder
(74) Attorney, Agent, or Firm—Joseph L. Strabala, Esq.

(57) ABSTRACT

A hand held mirror unit for use in beauty salons includes a planer housing, a mirror mounted in housing in a parallel relationship to the housing and a pair of handles extending from the planer housing on opposite sides of the housing with the handles having a cross-section exceeding the combined thickness of the planer housing and the mirror whereby neither said housing nor said mirror will contact a flat surface of a counter on which the unit is resting through engagement of the handles, along with a non-skid coating on the handles to prevent the mirror from sliding on such a flat surface.

3 Claims, 4 Drawing Sheets

SALON MIRROR WITH SUPPORT AND NON-SLIP HANDLES

BACKGROUND

A prime accessory in beauty salons is a hand held mirror, in order that a customer can see the results and direct the stylist. Such a mirror is required for each station and a variety of mirrors are currently available and in use in such salons where these hand held mirrors experience extremely heavy use.

Often these mirrors are scratched and or broken when used in such salons. Scratching occurs when the mirrors are placed on the counter and breakage occurs when the mirrors slide off the counter or alternatively are dropped by the stylist or the customer.

It is an object of this invention to provide a mirror which is less susceptible to damage from both scratching and breakage.

It is also an object to provide a mirror which has two handles so that stylist and customer can coordinate a viewing of the stylist's work.

Further it is an object to provide a hand held mirror which is less susceptible to damage if it is dropped.

Still another object is to provide a hand held mirror unit which will not easily slide off surfaces on which it has been placed due non-skid materials placed on its surface contacting handles.

Other objects and advantages will be understood from reading this specification in conjunction with the accompanying drawings.

SUMMARY OF THE INVENTION

A mirror unit for use in beauty salons includes a planer housing, a mirror mounted in housing in a parallel relationship to the housing and a pair of handles extending from the planer housing on opposite sides of the housing generally along its longitudinal axis with the handles having a cross section exceeding the combined thickness of the planer housing and the mirror whereby neither said housing nor said mirror will contact a flat surface on which said handles are resting, such as a counter. In the preferred embodiment a non-skid coating is incorporated on the handles to prevent the mirror from sliding on such a counter.

BRIEF DESCRIPTION OF THE DRAWINGS

The invention will be better understood by viewing the accompanying drawings in conjunction with this specification wherein.

DESCRIPTION OF A PREFERRED EMBODIMENT

Figure 1:
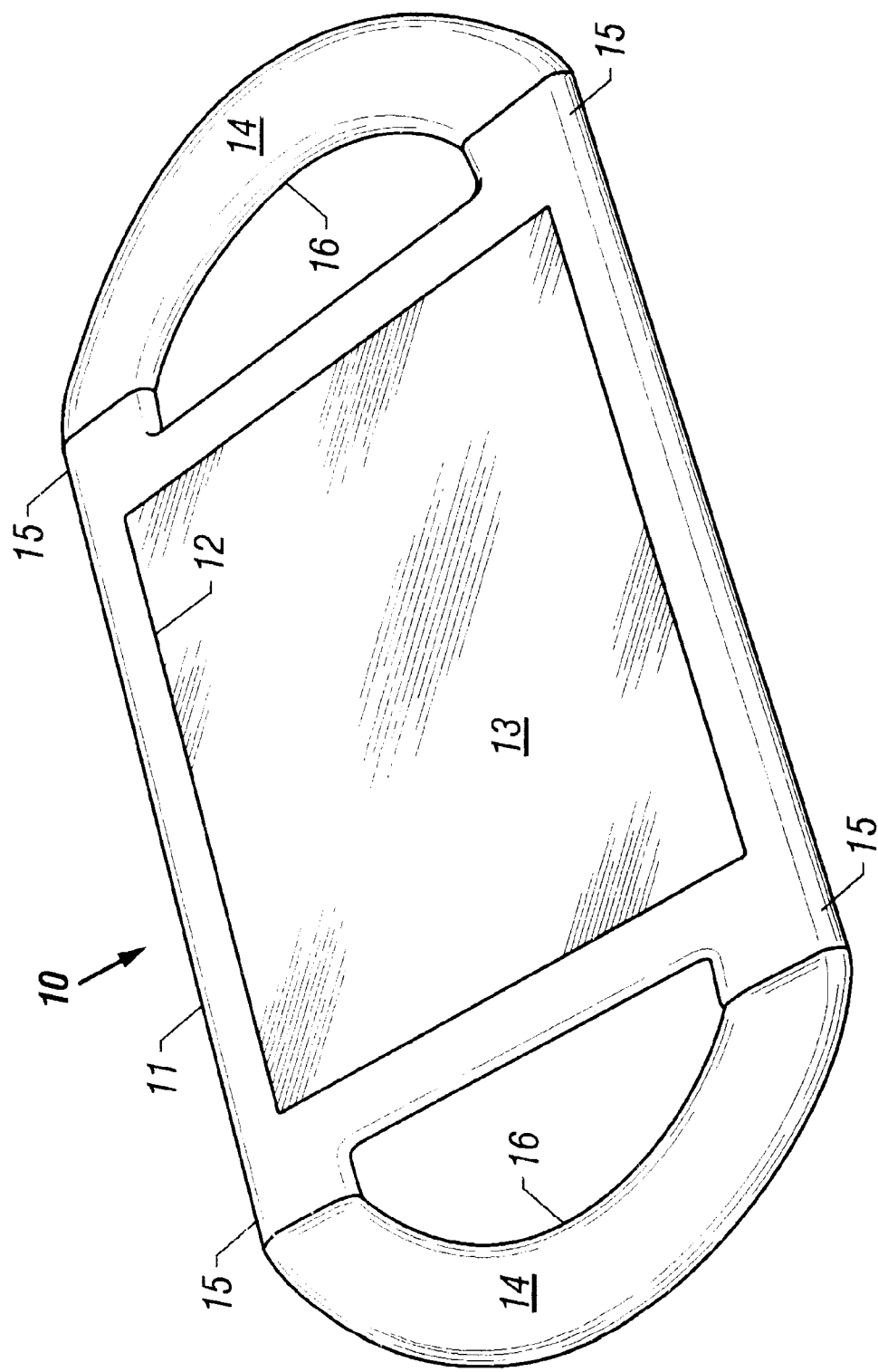
FIG. 1 is a perspective of the front face of the novel hand held mirror unit of this invention.
Figure 2:
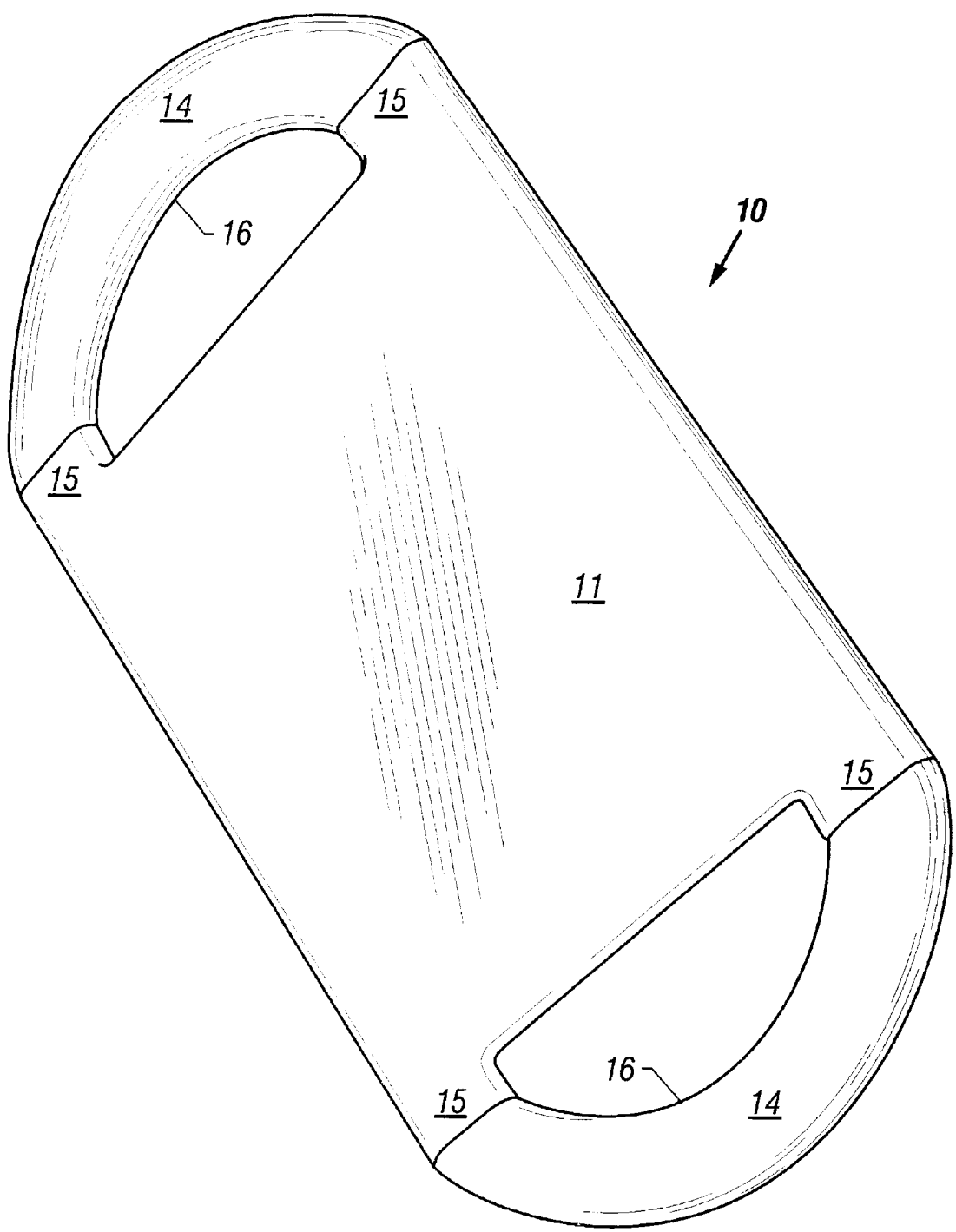
FIG. 2 is a perspective of the rear face of the novel hand held mirror unit of this invention.

The novel hand held mirror unit 10 is illustrated in FIGS. 1 and 2, and includes a planer body 11 which is constructed of a plastic, such as ABS plastic. Other plastics are also suitable. While this body is shown in a rectangular configurations in the drawings, it should be understood that other configurations, such oval, circular, oblong, etc. can be employed. This planer body is roughly about one-half an inch in thickness and includes a recess 12 for inserting a mirror 13.

On opposites sides of the planer body 11 an arcuate handle 14 is attached to the planer body, as can be seen in FIGS. 1 and 2, so that when the ends 15 of each handle are affixed to this body it will leave an opening 16 between each handle and body for holding the mirror unit. As can be seen the handle extend from the body generally along the longitudinal axis of the planer body and are generally positioned, when attached, so that these handles extend in the plane of the body as illustrated in the drawings.

Figure 3:
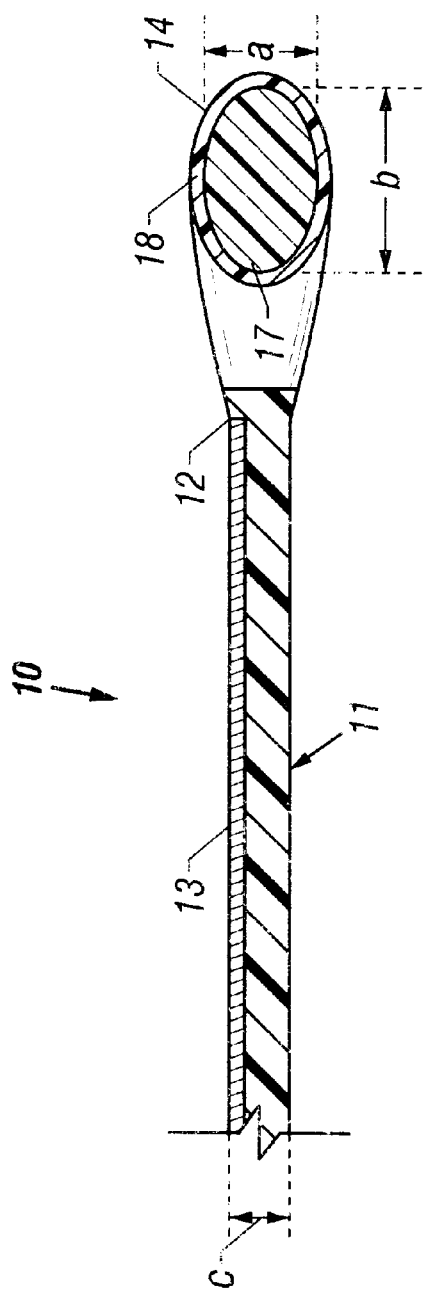
FIG. 3 is a cross-section of the novel hand held mirror unit shown in FIGS. 1 and 2 illustrating the connection of the handles to the main body of the mirror and the size relationship of the handles to the main body of the unit.
Figure 4:
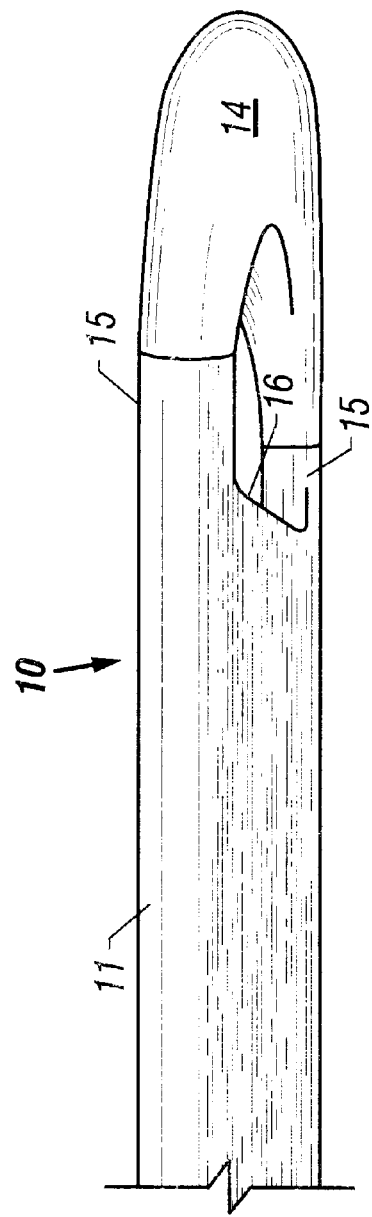
FIG. 4 is an elevation of the novel hand held mirror from one end illustrating the support of the main body of the unit by the handles on its opposite sides.
Figure 5:
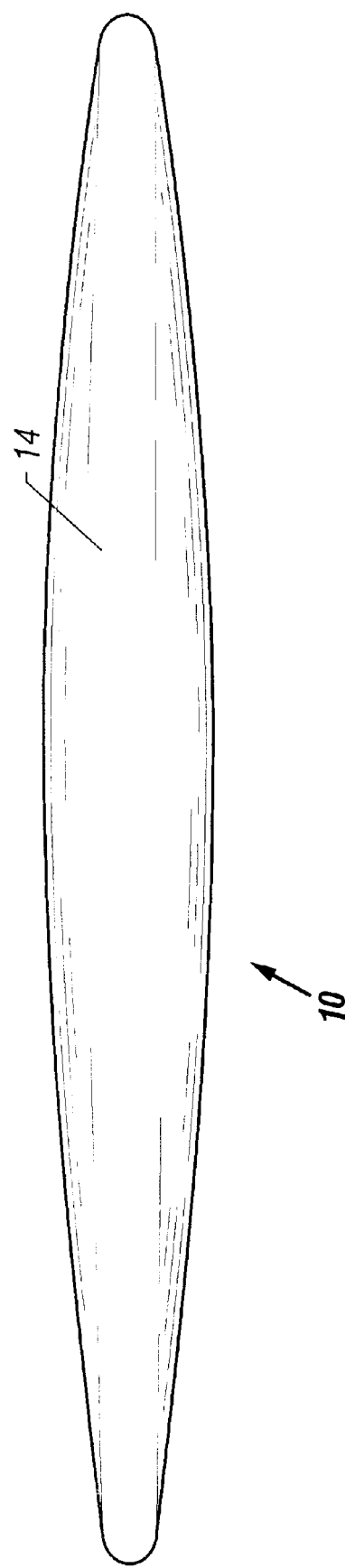
FIG. 5 is edge view of novel hand held mirror.

Critical to the invention is configuration of the handles 14 which have a cross-section 17 in the plane of the planer body which is greater than the combined thickness of the main body 11 and the mirror 13, as can be seen in FIG. 3. Specifically dimension "a" shown in this figure, exceeds the combined thickness of the a body and the mirror. Dimension "b" is not critical and is selected to give balance to the over all design. As a result when the handles are affixed to the main body and the mirror unit is placed on a counter, the handles will support the main body and mirror above the surface of the counter. Because of this support the mirror will be less likely to be scratched or damaged. Moreover, if the mirror unit is dropped the handles will protect the mirror from contact with the floor. In the embodiment illustrated the arcuate handles are tapered from the point their respective ends 15 are joined the main body to their central portion which has the largest cross-section in the plane of the planer body (see dimension "b") for the purposes addressed above. This gives the unit a more pleasing appearance than if the cross-section of the handles were uniform throughout their accurate length; this feature is best illustrated in FIG. 4. Further it should be understood that the cross-section of the handles aligned with the plane of the planer body are not critical and can be dimensioned to suit the designer's artistic flare as long as the critical dimension "a" is kept larger than the combined thickness of the planer body and the mirror.

While the above description has referred to the handles 14 as being attached to the planer body 11, in the preferred embodiment the handles are molded with the planer body in an injection molding machine as a unit.

To prevent the mirror unit 10 from sliding or skidding on a counter surface the handles 14 are coated with a rubber-like composite. A formulation suitable for the composite is composed of, by weight, of 12 to 13% styrene-ethylene/butylene-styrene block copolmer, 36 to 40% Styrene butadiene copolymer, 16 to 18% polystyrene, 14 to 17% reinforcing material, 18 to 22% of process oil, and less than 0.1 other additives. The above composite can be injection molded and typically after the planer body 11 with handles 14 integrated therewith is molded the resulting unit is placed in a second injection molding machine and the composite injected to form the coating 18 on the handles. This resulting coating or film on the handles has a high coefficient of friction and the mirror unit will not slide when placed on a flat surface, such as glass, inclined at an angle of 45 degrees from the horizontal. In addition these coatings or films are easily maintained and can be washed with common detergents and water, along with the mirror unit. Other coatings or films can be employed which have similar properties to the one described.

The handles 14 as shown are matched, that is both have the same configuration. However, mixed (not shown) as well as the matched configurations shown are suitable when disposed as taught by this invention and accomplishing the same function.

I claim:

1. A mirror unit for use in beauty salons comprising:

a flat planer housing;

a mirror mounted in said housing in a parallel relationship to said housing;

a first separate independent handle affixed to said planer housing and a second separate independent handle affixed to said planer housing on its opposite side, said handles having a cross-section in the plane of said housing exceeding the combined thickness of said planer housing and said mirror wherein neither said housing nor said mirror will contact a flat surface on which said handles are resting.

2. The mirror unit defined in claim 1 wherein the handles are coated with a non-skid rubber-like composition means operable to resist said mirror unit from sliding on a counter surface when placed thereon.

3. The mirror unit as defined in claim 2 wherein the non-skid rubber composition means is composed of by weight of 12 to 13% styrene-ethylene/butylene-styrene block copolmer, 36 to 40% Styrene butadiene copolymer, 16 to 18% polystyrene, 14 to 17% reinforcing material, 18 to 22% of process oil, and less than 0.1 other additives.

* * * * *